UNITED STATES PATENT OFFICE.

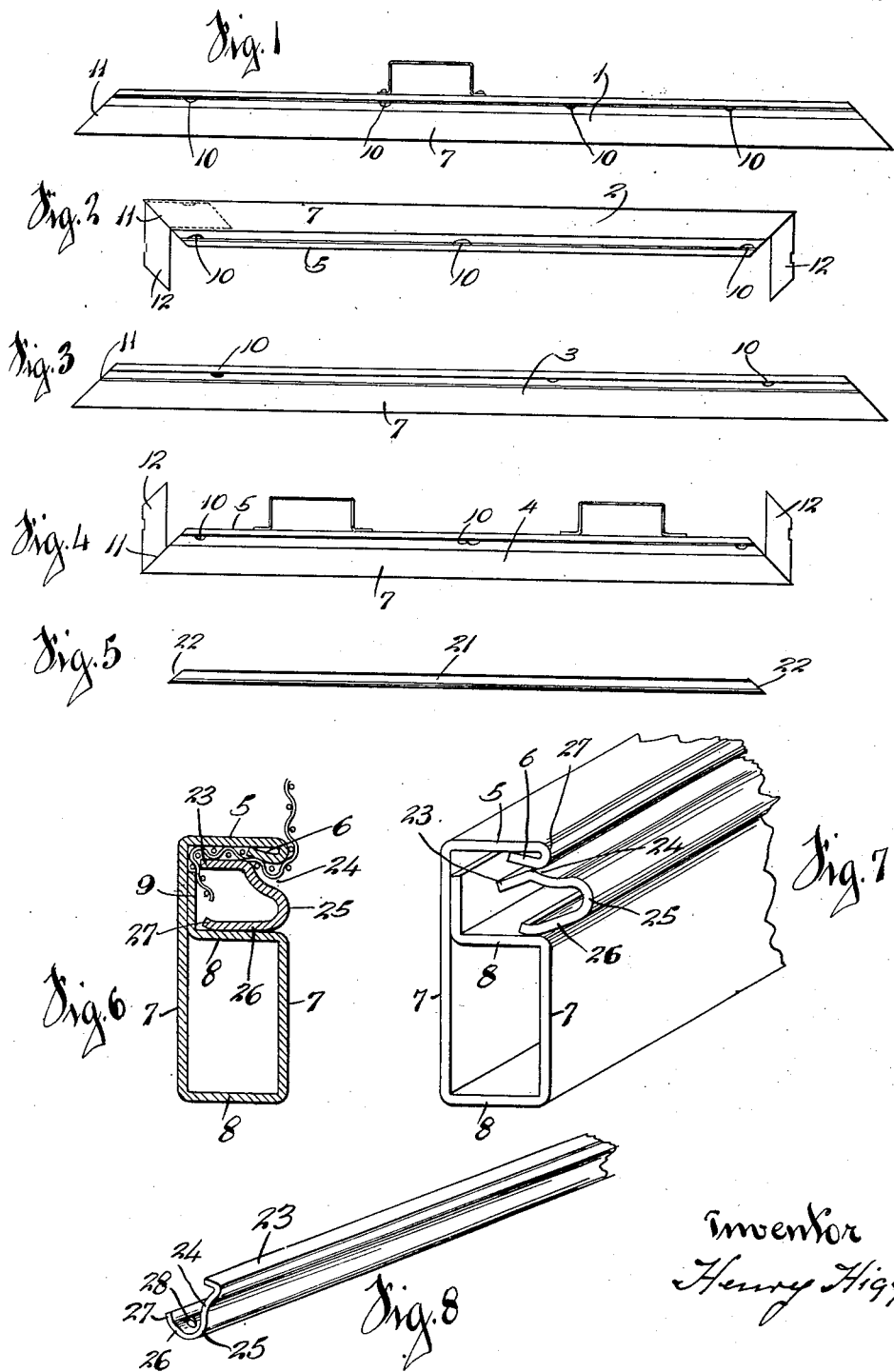

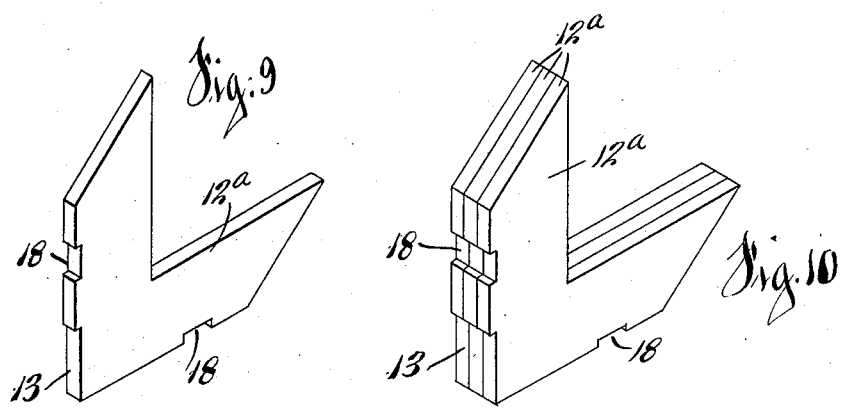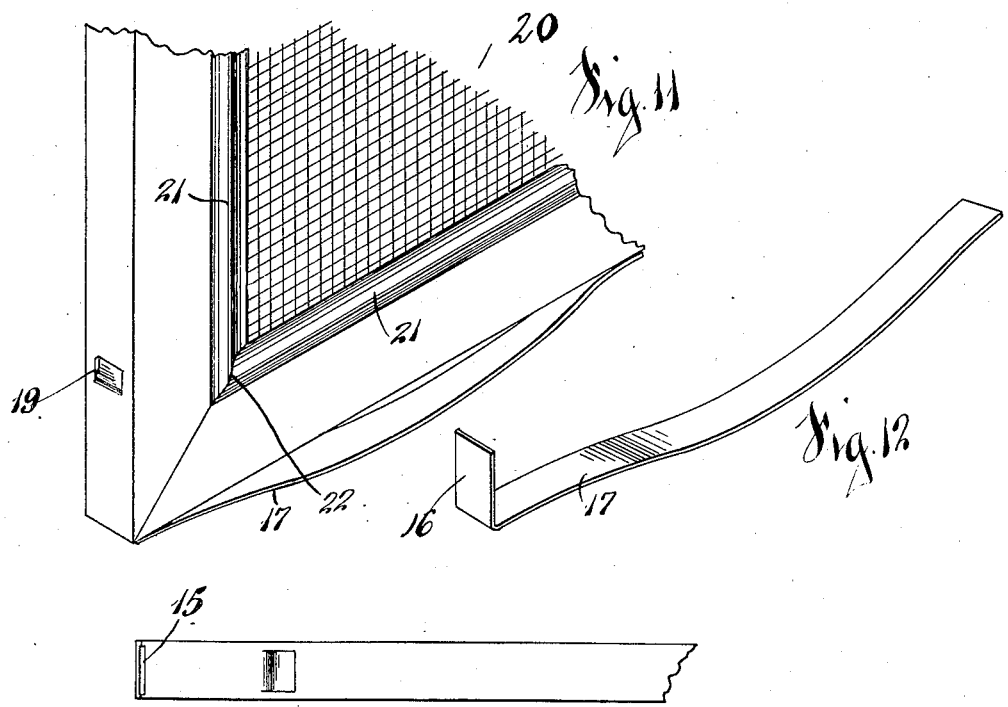

HENRY HIGGIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

KNOCKDOWN WINDOW-SCREEN.

1,171,952.   Specification of Letters Patent.   Patented Feb. 15, 1916.

Application filed July 9, 1915. Serial No. 38,973.

*To all whom it may concern:*

Be it known that I, HENRY HIGGIN, a citizen of the United States, and a resident of the city of Newport, in the county of Campbell and State of Kentucky, have invented certain new and useful Improvements in Knockdown Window-Screens, of which the following is a full, clear, and exact description, reference being had to the accompanying drawings, forming part of this specification.

My invention relates to window screens with metal frames and the object of my invention is to provide a construction for such all-metal screens which will not only readily and easily permit replacement in the field of the wire netting when worn out, but which can be sold and shipped by the manufacturer in "knockdown" condition with the sides and ends of the frame either cut and mitered of the proper size for the windows to be screened, or with the molding and splines in uniform lengths ready to be cut and mitered for the sizes required, and in which the molding strips and splines may be coated with rustproof enamel both inside and out to completely avoid liability to rust.

Up to the present time in the manufacture of all custom-made metal frame window screens, it has been necessary to furnish the manufacturer with the exact sizes for the openings and each screen has to be manufactured complete and ready for use and necessarily has to be most carefully boxed and packed for shipment. Not only in this expensive, but the freight classification for such goods is very high and especially for remote points and for foreign trade. Then as such screens have not heretofore been constructed except on special measurements, it is evident that a single mistake in the measurement may delay the completion of a contract for supplying screens many weeks or even months, until the correct measurement can be furnished the manufacturer and the special screen made up and returned to the purchaser.

One reason why no attempts have been heretofore made to furnish all-metal screens in knockdown condition is the fact that in the variety of constructions on the market it has been found necessary to interlock the corners or solder the parts together in such a way as to render it impractical for the mechanic in screening a house to cut and fit together the parts of the frame. Where solder is employed, this is especially impracticable, and, moreover, the use of solder prevents the treatment of the molding with baked rustproof enamel as hereinafter described, as the solder will not stand the heat of 300°–400° F. to which the molding must be subjected in applying the enamel.

Accordingly it is the object of my invention to provide a screen in which the moldings may be shipped in bulk to be cut and mitered at the corners, and to provide inserts for reinforcing the corners of the screens which are not riveted in place, but are locked in the desired position, without rivets.

It is also my object to provide for a screen molding which is not of the "solid tubular shape," but a molding made of such heavy metal that the desired rectangular shape may be made by folding the sheet metal into rectangular form with a channel portion extending therefrom, as will be described, and merely tacking the edges lapping over from the frame piece proper together by means of spot-welds or rivets every six to twelve inches. By doing this the faulty "solid" moldings of the past, requiring as they do the use of materials which inevitably result in the wearing out of the screen, are done away with, and the result of using heavy metal is that the moldings may be sawed and fitted without chance of bending them out of line and thereby rendering them useless. These objects I accomplish by that certain construction and arrangement of parts to be hereinafter more specifically pointed out and claimed.

In the drawings, Figures 1 to 5 are respectively the left side, top, right side and bottom moldings of the screen, and the cam-shaped clamping molding, in side elevation. Fig. 6 is a cross section of the molding with the wire netting in place. Fig. 7 is a perspective view of the molding and the clamping molding partly inserted therein. Fig. 8 is a perspective view of the clamping molding. Fig. 9 is a perspective view of one of the plates making up the corner piece. Fig. 10 is a like view of the corner piece entire. Fig. 11 is a detail perspective view of a corner of the screen showing the spring in place. Fig. 12 is a perspective view of the spring. Fig. 13 is a detail elevation showing the corner of the screen with the spring removed.

As stated heretofore, the moldings are formed up into a rectangular shape with a channel formed along their inner side, this being the usual shape of molding today. The screen has sides 1 and 3, and ends 2 and 4, each formed from strips of heavy sheet metal such as twenty gage U. S. standard. The strips are formed up by bending them so as to form the inner wall or channel wall 5, having the outer edge turned over to form a bead 6. Four bends are given to the strip to form a rectangular shape, with side walls 7, 7, and end walls 8, 8, with the inner end wall forming one of the channel walls, and the balance of the strip bent at 9 so as to lie along the outer side wall 7 at the base of the channel. The molding strips so formed are provided with a few spot-welds 10 made along the lapping edges at 9. These suffice to hold the molding from springing out of shape upon long use, and still do not seal up the rectangular space inside the moldings which tends to form a chamber where sweating will take place. The moldings are then dipped into rust-proof enamel so as to completely cover the molding both inside and out and the enamel is firmly fixed by baking so that it will not wear. This, as stated, would be impossible in the soldered tube frame because it would destroy the solder or spelter by excessive heat.

The moldings may be shipped in any length that is convenient and when being fitted to the windows or doors, are to be cut to form a miter 11 at the end of each piece, which can be easily done with ordinary tools by a workman. The corner pieces 12 are provided made up of a plurality of right angle plates of metal 12ª. These plates do not have to be fastened together as they are fitted to the molding so that they may be driven into the molding ends filling the corners as if they were made of one solid piece. The plates are flat and are concealed when the screen frame is made up, and in making up the screen the corner pieces are ordinarily driven into the ends of the top and bottom molding (Figs. 2 and 4), and then the two side moldings are placed between and simultaneously forced into place, making a complete frame.

It will be understood that when the wire netting is placed and locked by the clamping molding, that the screen is firmly bound together from all points making the average size screen very substantial. In large screens, however, it will be necessary to lock the corner pieces in place, this is done, as stated, without riveting. The method and mechanism for mounting the netting will presently be described. The corner pieces have offsets 13, and where sliding screens are wanted, they are placed so that the slot 15 admits the short angle 16 of the spring 17 to enter and become firmly fixed. The corner pieces, for locking, have notches 18, 18, formed in their two arms. The screen mountings when they are to be locked are marked at the points where the notches will be when the parts are assembled and with a punch and hammer the workman will dent in the moldings at 19 so as to engage the notch and permanently lock the screen in place.

For mounting the wire netting 20 in the screen, four splines 21 are provided, cut to length to fit the four channels of the molding and mitered at the ends. These splines, as in the case of the molding, may be cut at the point of installation. The splines are formed of stiff sheet metal so as to be non-resilient and are bent to form a straight wall 23 which fits in between the bead 6 and the space left beyond the end 9 of the molding and the inner channel wall. The spline then slopes away at 24 so as to leave a space between it and the bead 6, thereby preventing any pinching of the netting at the point and allowing the netting to expand and contract. The spline then bends around at 25 so as to form a well finished filler for the channel, and flattened at 26 to lie along the inner channel wall, the end at 27 being turned inwardly so as to facilitate inserting of the spline. In putting in the netting, the edge of it at each side is pushed into the channel, and the splines set with their curves 24 bearing against the bead 6 (Fig. 7). The spline may then be rolled into place (Fig. 6) and will form a tight fit. Moreover a pull on the spline at the point where it engages the netting at the portion 23, will only result in rolling it more firmly into place.

I thus provide a screen which has nowhere any spelter or solder, and is only spot-welded at intervals for the purpose of tacking down the terminal bend of the molding strips. The means of locking the corners by means of denting in the molding to form a key for the corner pieces, is not requisite for small screens, and the whole screen may be knocked-down at any time by removing the spline. The splines are also removable in any case for rewiring the screen, and for disengaging the spline for this purpose small holes 28 are formed in the portions 26 of the splines, which holes may be engaged by any 8d. nail.

Having thus described my invention, what I claim as new and desire to secure by Letters Patent, is:

1. In an all-metal window screen, a metal framework formed of a single strip of sheet metal folded to form a hollow body portion with the sides of the strip contacting and extending laterally to form a side channel with the contacting portions tacked at intervals to retain the overlapping edges.

2. In an all-metal window screen, a metal framework formed of a single strip of sheet metal folded to form a hollow body portion with the sides of the strip contacting and extending laterally to form a side channel with the contacting portions tacked at intervals to retain the overlapping edges and having the metal coated both inside and outside with baked rustproof enamel.

3. In an all-metal window screen, a metal framework formed of a single strip of sheet metal folded to form a hollow body portion with the sides of the strip contacting and extending laterally to form a side channel with one portion of the metal strip extended upward to form a single wall with wire gauze seated in the channel and a non-resilient spline for holding the wire in place, the contacting portions of the framework tacked at intervals to retain the overlapping edges.

4. In an all-metal window screen, a metal framework formed of a single strip of sheet metal folded to form a hollow body portion with the sides of the strip contacting and extending laterally to form a side channel with one portion of the metal strip extended upward to form a single wall with wire gauze seated in the channel and a non-resilient spline for holding the wire in place, the contacting portions of the framework tacked at intervals to retain the overlapping edges, and the metal framework finished both inside and outside with baked rustproof enamel.

5. In a window screen, in combination with a metallic frame formed with a groove to receive the wire netting, with a bead along the lateral edge of the groove, of a spline to lock the wire netting in the groove, the spline provided with a longitudinal groove to permit the same to be inserted around the bead in seating the spline in the groove, the parts being so formed as to provide a space between the spline and the bead to allow for drying out when subjected to rain and moisture.

6. In a window screen, in combination with a metallic frame formed with a groove to receive the wire netting, with a bead along the lateral edge of the groove, of a spline to lock the wire netting in the groove, the spline comprising a strip of sheet metal bent to form side wings to bear against the side walls of the groove, and with the connecting web of the spline curved longitudinally to pass around the bead to permit of the ready insertion of the spline.

7. In a window screen, in combination with a metallic frame formed with a groove to receive the wire netting, with a bead along the lateral edge of the groove, of a spline to lock the wire netting in the groove, the spline comprising a strip of sheet metal bent to form parallel sides to bear against the side walls of the groove, and with the connecting web of the spline curved longitudinally to pass around the bead, and the parts being so formed as to provide a space between the spline and the bead to allow for drying out.

8. In a window screen, frame sections formed from a plate of comparatively stiff sheet metal bent to form a rectangular hollow frame, with an outer wall spaced therefrom to leave a retaining groove for the wire netting, non-resilient splines arranged to be seated in said groove to secure the wire netting, and metal corner pieces to fit within the hollow frames, said corner pieces being formed of a plurality of plates which together exactly fill the hollow portions at the corners, as and for the purpose specified.

9. In a window screen, frame sections formed from a plate of comparatively stiff sheet metal bent to form a rectangular hollow frame, with an outer wall spaced therefrom to leave a retaining groove for the wire netting, splines arranged to be seated in said groove to secure the wire netting, and metal corner pieces to fit within the hollow frames, and notches in the corner pieces whereby they may be locked in place by denting in the moldings, as and for the purpose described.

10. In a window screen, frame sections formed of metal bent to form a hollow molding, a groove therein for retaining the wire netting, and corner pieces for retaining the sections at the corners, said pieces being of a size to fit within and be concealed by the moldings, and notches formed in the corner pieces to be engaged by denting in the screen moldings after the parts are assembled.

HENRY HIGGIN.

Witnesses:
 HORACE C. DRAKE,
 GEORGE E. RICHARDS.